United States Patent
Jung et al.

(10) Patent No.: US 8,423,329 B2
(45) Date of Patent: Apr. 16, 2013

(54) SYSTEM AND METHOD OF ADJUSTING A RESISTANCE-BASED MEMORY CIRCUIT PARAMETER

(75) Inventors: Seong-Ook Jung, San Diego, CA (US);
Jisu Kim, San Diego, CA (US);
Jee-Hwan Song, San Diego, CA (US);
Seung H. Kang, San Diego, CA (US)

(73) Assignees: QUALCOMM Incorporated, San Diego, CA (US); Industry-Academic Cooperation Foundation, Yonsei, Seoul (KR)

( * ) Notice: Subject to any disclaimer, the term of this patent is extended or adjusted under 35 U.S.C. 154(b) by 635 days.

(21) Appl. No.: 12/691,415

(22) Filed: Jan. 21, 2010

(65) Prior Publication Data

US 2011/0178768 A1    Jul. 21, 2011

(51) Int. Cl.
*G06F 17/50* (2006.01)
(52) U.S. Cl.
USPC .................. 703/2; 703/13; 703/18; 365/148; 365/226; 365/189.09
(58) Field of Classification Search ............... 703/2, 13, 703/18; 365/148, 226, 189.09
See application file for complete search history.

(56) References Cited

U.S. PATENT DOCUMENTS

| | | |
|---|---|---|
| 6,625,057 B2 | 9/2003 | Iwata |
| 6,741,104 B2 | 5/2004 | Forbes et al. |
| 7,082,389 B2 | 7/2006 | Nahas |
| 7,251,178 B2 | 7/2007 | Gogl et al. |
| 7,885,799 B2 * | 2/2011 | Huang et al. .................. 703/13 |
| 7,907,456 B2 * | 3/2011 | Houston et al. .......... 365/189.09 |
| 2007/0058308 A1 * | 3/2007 | Thijs et al. ...................... 361/56 |
| 2008/0141190 A1 | 6/2008 | Jung et al. |
| 2008/0319721 A1 * | 12/2008 | Huang et al. ...................... 703/2 |
| 2009/0109785 A1 * | 4/2009 | Houston et al. ............... 365/226 |
| 2010/0321976 A1 * | 12/2010 | Jung et al. ..................... 365/148 |

OTHER PUBLICATIONS

Written Opinion—PCT/US2011/021988—ISA/EPO—Jan. 21, 2011.

* cited by examiner

*Primary Examiner* — Thai Phan
(74) *Attorney, Agent, or Firm* — Sam Talpalatsky; Nicholas J. Pauley; Jonathan T. Velasco

(57) ABSTRACT

Systems and methods of resistance-based memory circuit parameter adjustment are disclosed. In a particular embodiment, a method of determining a set of parameters of a resistance-based memory circuit includes determining a range of sizes for a clamp transistor and selecting a set of clamp transistors having sizes within the determined range of sizes. For each clamp transistor in the set of clamp transistors, a simulation may be executed to generate a first contour graph representing current values over a range of statistical values. The first contour graph may be used to identify a read disturbance area and a design range of the gate voltage of the clamp transistor and a load of the clamp transistor. The method may execute a simulation to generate a second contour graph representing sense margin over a range of statistical values of the gate voltage of the clamp transistor and the load of the clamp transistor. A sense margin may be selected based on the second contour graph that also satisfies the design range of the first contour graph. A sense margin may be determined for a selected clamp transistor in the set of transistors and the corresponding gate voltage and the load of the selected clamp transistor is determined based on the determined sense margin.

33 Claims, 9 Drawing Sheets

SYSTEM AND METHOD OF ADJUSTING A RESISTANCE-BASED MEMORY CIRCUIT PARAMETER

I. FIELD

The present disclosure is generally related to a system and method of adjusting resistance-based memory circuit parameters.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. However, power consumption of such portable devices can quickly deplete a battery and diminish a user's experience.

Reducing power consumption has led to smaller circuitry feature sizes and lower operating voltages within such portable devices. Reduction of feature sizes and operating voltages, while reducing power consumption, also increases circuit sensitivity to noise and to manufacturing process variations. Such increased sensitivity to noise and to process variations adds complexity to the design of memory devices that use sense amplifiers.

III. SUMMARY

A particular embodiment may provide a method to select parameters for transistors used by a sense amplifier of a bit cell that includes resistive storage and an access transistor. Aspects of the particular embodiment may adjust design parameters of a first sense amplifier to increase a signal difference between a data cell and a reference cell. The signal difference is fed to a second sense amplifier and may be large enough to increase signal margin and yield of a memory drive. Exemplary circuit design parameters include a size of a load transistor (e.g., a p-channel metal oxide semiconductor (PMOS) device), a size of a clamp transistor (e.g., an n-type metal oxide semiconductor (NMOS) device), and a gate voltage of the clamp transistor. Since spin torque transfer magnetoresistive random access memory (STT-MRAM) uses the same path for read and write operations, read-disturbance may be considered during parameter selection. Monte Carlo simulations may be used to determine a range of sizes of the load transistor and a range of gate voltages of the clamp transistor to prevent read disturbance. The size of a load transistor and the gate voltage of the clamp transistor of the memory cell may be determined within the ranges found using the Monte Carlo simulation.

In another particular embodiment, a method determines a set of circuit parameters by determining a range of sizes for a clamp transistor and selecting a set of clamp transistors in which each clamp transistor has a size within the determined range of sizes. For each clamp transistor in the set of clamp transistors, a simulation is executed to generate a first contour graph representing current data over a range of statistical values. The first contour graph identifies a read disturbance area and a design range of a gate voltage of the clamp transistor and a load of the clamp transistor. The method further performs a simulation to generate a second contour graph representing a sense margin over a range of statistical values of the gate voltage of the clamp transistor and the load of the clamp transistor. A high sense margin is selected based on the second contour graph that also satisfies the design range of the first contour graph. A sense margin for one of the clamp transistors in the set of transistors is determined, and the corresponding gate voltage and load of the clamp transistor are selected based on the determined sense margin.

In another particular embodiment, a method determines a set of circuit parameters by determining a range of sizes for a clamp transistor and selecting a set of clamp transistors each having a size within the determined range of sizes. For each clamp transistor in the set of clamp transistors, a simulation is executed to generate a first set of results representing current data over a range of statistical values. The first set of results identifies a read disturbance area and a design range of a gate voltage of the clamp transistor and a load of the clamp transistor. The method further performs a simulation to generate a second set of results representing a sense margin over a range of statistical values of the gate voltage of the clamp transistor and the load of the clamp transistor. A high sense margin is selected based on the second contour graph that also satisfies the design range of the first set of results. A sense margin for one of the clamp transistors in the set of clamp transistors is determined, and the corresponding gate voltage and load of the clamp transistor are selected based on the determined sense margin.

In another particular embodiment, a sense amplifier circuit includes a PMOS transistor and an NMOS transistor. A size of the PMOS transistor and a gate voltage of the NMOS transistor are determined by determining a range of sizes for the NMOS transistor and selecting a set of NMOS transistors each having a size within the determined range of sizes. For each transistor in the set of NMOS transistors, a first simulation is executed to generate a first set of results representing current values over a first statistical range. The first set of results identifies a read disturbance range and a valid operating range of the gate voltage of the NMOS transistor and a load of the NMOS transistor. A second simulation is executed to generate a second set of results representing a sense margin of the sense amplifier over a second statistical range and to identify values of the gate voltage of the NMOS transistor and the load of the NMOS transistor. A sense margin of the sense amplifier is selected that is above a sense margin threshold based on the second set of results and that is also within the valid operating range of the first set of results. A sense margin is selected for one of the transistors in the set of NMOS transistors based on the first set of results and based on the second set of results. The gate voltage of the NMOS transistor and a size of the PMOS transistor are selected based on the selected sense margin.

In another particular embodiment, a sense amplifier circuit includes a load transistor and a clamp transistor. A size of the load transistor and a gate voltage of the clamp transistor are selected within a valid operating region to prevent a current read disturbance based on results of a first statistical simulation and are selected based on a sense margin of the sense amplifier based on results of a second statistical simulation.

In another particular embodiment, an apparatus includes means for determining a range of sizes for a clamp transistor and selecting a set of clamp transistors each having a size within the determined range of sizes. For each clamp transistor in the set of clamp transistors, the apparatus includes means for performing a first simulation to generate a first set of results representing current values over a first statistical range. The first set of results identifies a read disturbance range and a valid operating range of the gate voltage of the clamp transistor and a load of the clamp transistor. The apparatus further includes means for performing a second simulation to generate a second set of results representing sense margin over a second statistical range and to identify values of the gate voltage of the clamp transistor and the load of the clamp transistor. Means are included for selecting a sense margin above a sense margin threshold based on the second set of results that also satisfies the valid operating range of the first set of results. The sense margin corresponds to a selected one of the clamp transistors in the set of transistors based on the first set of results and based on the second set of results. The gate voltage of the selected clamp transistor and a size of a load transistor are selected based on the selected sense margin.

A particular advantage provided by the disclosed embodiments is that circuit parameters may be determined to achieve a desired sense amplifier margin at a resistance-based memory circuit. Circuit parameters may be determined based on circuit simulation results to improve sense amplifier margins and to operate within a valid operating range.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
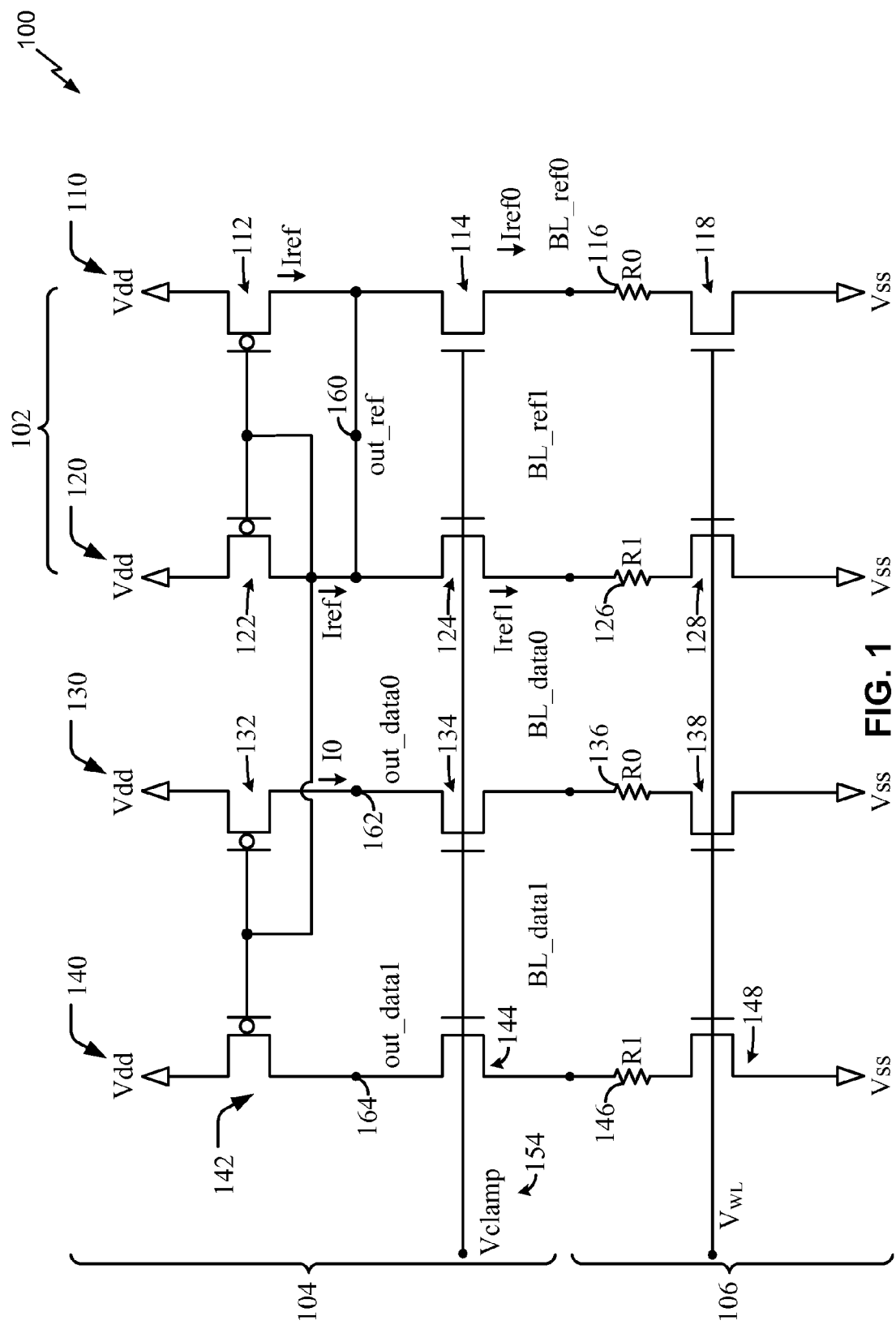
FIG. 1 is a circuit diagram of a particular illustrative embodiment of a memory circuit.

Referring to FIG. 1, a particular illustrative embodiment of a resistance-based memory is depicted and generally designated 100. The memory 100 includes a reference circuit 102 having a first reference path 110 and a second reference path 120. The memory 100 also includes a representative bit-zero data path 130 and a representative bit-one data path 140. The reference paths 110 and 120 and the data paths 130 and 140 are generally designated as having a sense amplifier portion 104 that provides load elements to a memory cell portion 106, where the sense amplifier portion 104 generates an output signal for comparison at a second sense amplifier (not shown). In a particular embodiment, the memory 100 is a magnetoresistive random access memory (MRAM), a phase-change random access memory (PRAM), or a spin torque transfer magnetoresistive random access memory (STT-MRAM).

The first reference path 110 includes a load device, such as a p-type metal-oxide-semiconductor field-effect transistor (PMOS) load 112. The PMOS load 112 is coupled to a reference node (out_ref) 160, which in turn is coupled to a clamp transistor 114. A resistance R0 116 corresponding to a logic "zero" state of a resistance-based memory element is coupled to the clamp transistor 114. A resistance-based memory element is a device having a first resistance corresponding to a logic "one" value and a second resistance corresponding to a logic "zero" value, such as a magnetic tunnel junction (MTJ) device or a PRAM memory cell as illustrative, non-limiting examples. An access transistor 118 is coupled to the resistance R0 116.

The second reference path 120 includes a load device, such as a PMOS load 122. The PMOS load 122 is coupled to the reference node (out_ref) 160, which in turn is coupled to a clamp transistor 124. A resistance R1 126 corresponding to a logic "one" state of a resistance-based memory element is coupled to the clamp transistor 124. An access transistor 128 is coupled to the resistance-based memory element having the resistance-based memory element having the resistance R1 126.

The representative bit-zero data path 130 includes a load device, such as a PMOS load 132. The PMOS load 132 is coupled to a reference node (out_data0) 162, which in turn is coupled to a clamp transistor 134. A resistance-based memory element having a logic "zero" state is represented as a resistance R0 136, which is coupled to the clamp transistor 134. An access transistor 138 is coupled to the resistance-based memory element having the resistance-based memory element having the resistance R0 136.

The representative bit-one data path 140 includes a load device, such as a PMOS load 142. The PMOS load 142 is coupled to a reference node (out_data1) 164, which in turn is coupled to a clamp transistor 144. A resistance-based memory element having a logic "one" state is represented as a resistance R1 146, which is coupled to the clamp transistor 144. An access transistor 148 is coupled to the resistance-based memory element having the resistance R1 146.

Generally, corresponding components of each of the paths 110, 120, 130, 140 may have similar configurations and may operate in a substantially similar manner. Each of the clamp transistors 114, 124, 134, and 144 functions to limit current and voltage through the respective paths 110, 120, 130, and 140 based on a signal Vclamp 154. Vclamp 154 represents a common gate voltage of the clamp transistors 114, 124, 134, and 144. Each of the access transistors 118, 128, 138, and 148 selectively allows current flow through the respective paths 110, 120, 130, and 140 based on a common signal $V_{WL}$ that represents a common gate voltage to the access transistors 118, 128, 138, and 148. Each of the PMOS load devices 112, 122, 132, and 142 has a gate terminal that is coupled to the out_ref node 160.

In a particular embodiment, a signal margin, such as a sense amplifier margin, corresponds to a difference between a voltage at the out_data1 node 164 and a voltage at the out_ref node 160 ($\Delta V_1$) or a difference between a voltage at the out_ref node 160 and a voltage at the out_data0 node 162 ($\Delta V_0$), whichever is smaller. The signal margin may be improved by increasing a difference between the voltage at the out_data1 node 164 and the voltage at the out_data0 node 162. An embodiment may determine circuit parameters, such as a value for a width and a gate voltage for a clamp transistor 144, as well as a width of a PMOS load 142. A designer of the memory circuit 100 may adjust these circuit parameters in a manner that satisfies design constraints while enabling the signal margin to approach a physically maximum value given process variation and other considerations.

Figure 2:
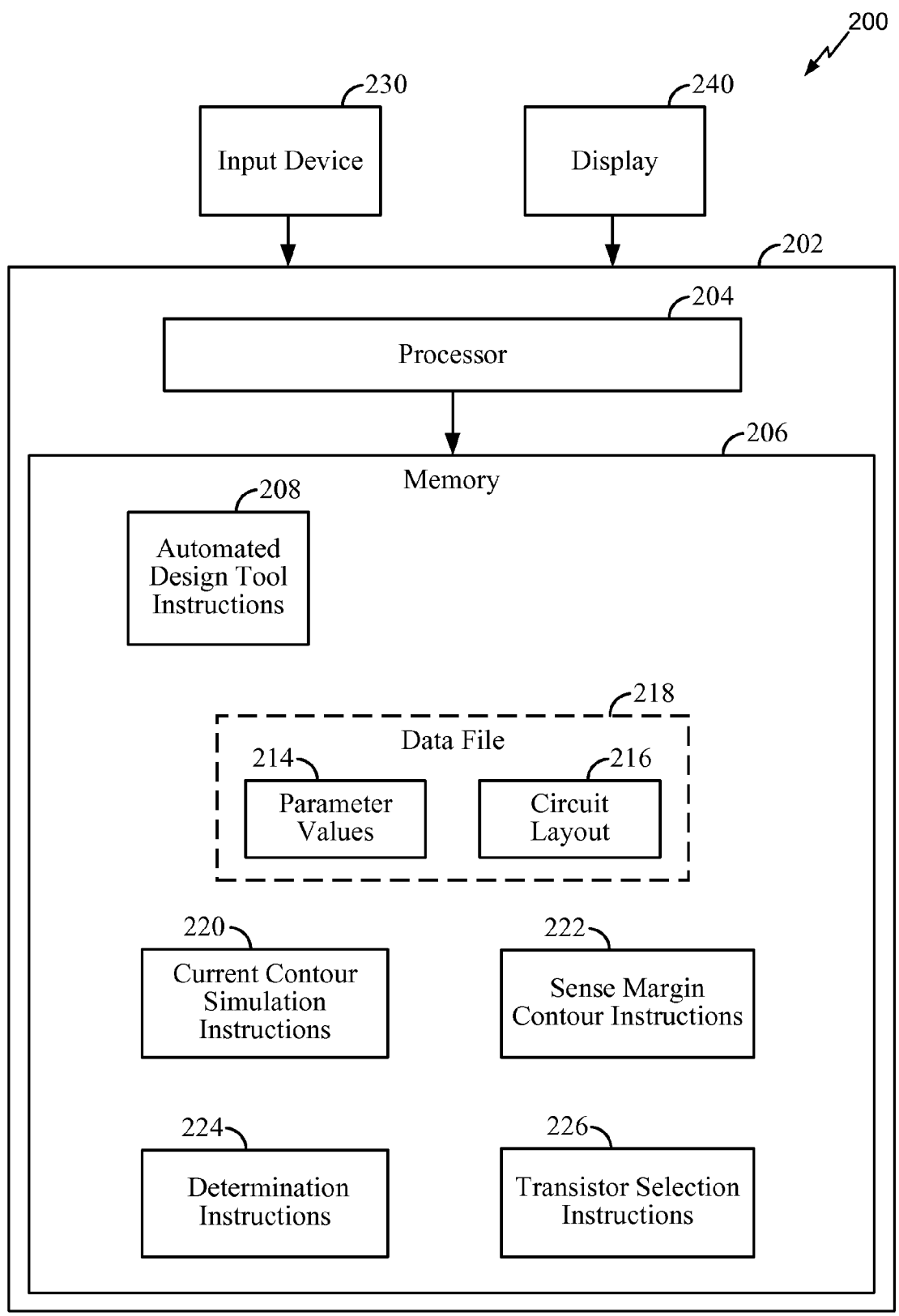
FIG. 2 is a block diagram of particular illustrative embodiment of a system to determine circuit parameters of the memory circuit of FIG. 1.

FIG. 2 shows a block diagram of a particular illustrative embodiment of a system to determine memory circuit parameters, the system generally designated 200. In a particular embodiment, the system 200 may be configured to determine a width and a gate voltage for a clamp transistor (such as clamp transistor 144), as well as a width of a load (such as PMOS load 142), as depicted in FIG. 1. The system 200 includes a device 202 having at least one processor 204 and a memory 206 that is accessible to the processor 204. The memory 206 includes media that is readable by the processor 204 and that stores data and program instructions that may be executed by the processor 204, including automated design tool instructions 208, current contour simulation instructions 220, sense margin contour instructions 222, determination instructions 224, and transistor selection instructions 226. The memory 206 also includes a data file 218 that includes parameter values 214 and a circuit layout 216. An input device 230 and a display 240 are coupled to the device 202. In a particular embodiment, the input device 230 may include a keyboard, a pointing device, a touch screen, a speech interface, another device to receive user input, or any combination thereof.

In a particular embodiment, the automated design tool instructions 208 may be executed by the processor 204 to enable a user to design a circuit via the input device 230 and the display 240 and to store data associated with elements and connections of the circuit as the circuit layout 216. One or more device or circuit parameters associated with the circuit layout 216 may be stored as parameter values 214. The current contour simulation instructions 220 and the sense margin contour instructions 222 may be executed by the processor 204 to read data from the data file 218 and to perform one or more simulations to model a behavior of a circuit represented by the circuit layout 216. For example, the current contour simulation instructions 220 may be executed to generate a first contour graph that includes a read disturbance area and a design region. A number of current contour values may be generated using Monte Carlo simulations that plot a range of load values for a particular clamp transistor along the x-axis of the graph and a range of gate voltages of the clamp transistor along the y-axis. In one embodiment, the range of load values may include a range of sizes, e.g., widths, of a load transistor in electrical communication with the clamp transistor.

The sense margin contour instructions 222 may be executed by the processor 204 to generate a second contour graph. The second contour graph may include the design region and disturbance area that were determined from the first contour graph. The second contour graph may also include a number of sense margin contour values.

The determination instructions 224 may be used to select a sense margin by determining the highest sense margin included within the design region. From the selected sense margin, a load value associated with a particularly sized clamp transistor may be determined. For example, a width of a load transistor that would satisfy the selected sense margin may be identified. Similarly, a gate voltage for the clamp transistor may be determined using the selected sense margin.

The transistor selection instructions 226 may determine a size of the clamp transistor using the results from the second contour graph. A comparison graph may be generated that plots the range of sizes of the selected clamp transistors against the sense margins determined from the respective contour graphs. The comparison graph may be used to determine which sized clamp transistor should be included within the circuit layout 216.

Although depicted as separate components, the automated design tool instructions 208, current contour simulation instructions 220, sense margin contour instructions 222, determination instructions 224, transistor selection instructions 226, or any combination thereof, may be integrated into a single software package or software application. As an illustrative, non-limiting example, the automated design tool instructions 208 may be implemented as a feature of a commercial computer-aided design (CAD) tool, and the current contour simulation instructions 220 and sense margin contour instructions 222 may be performed by use of a commercially available numerical computing environment, such as MATLAB.

Figure 3:
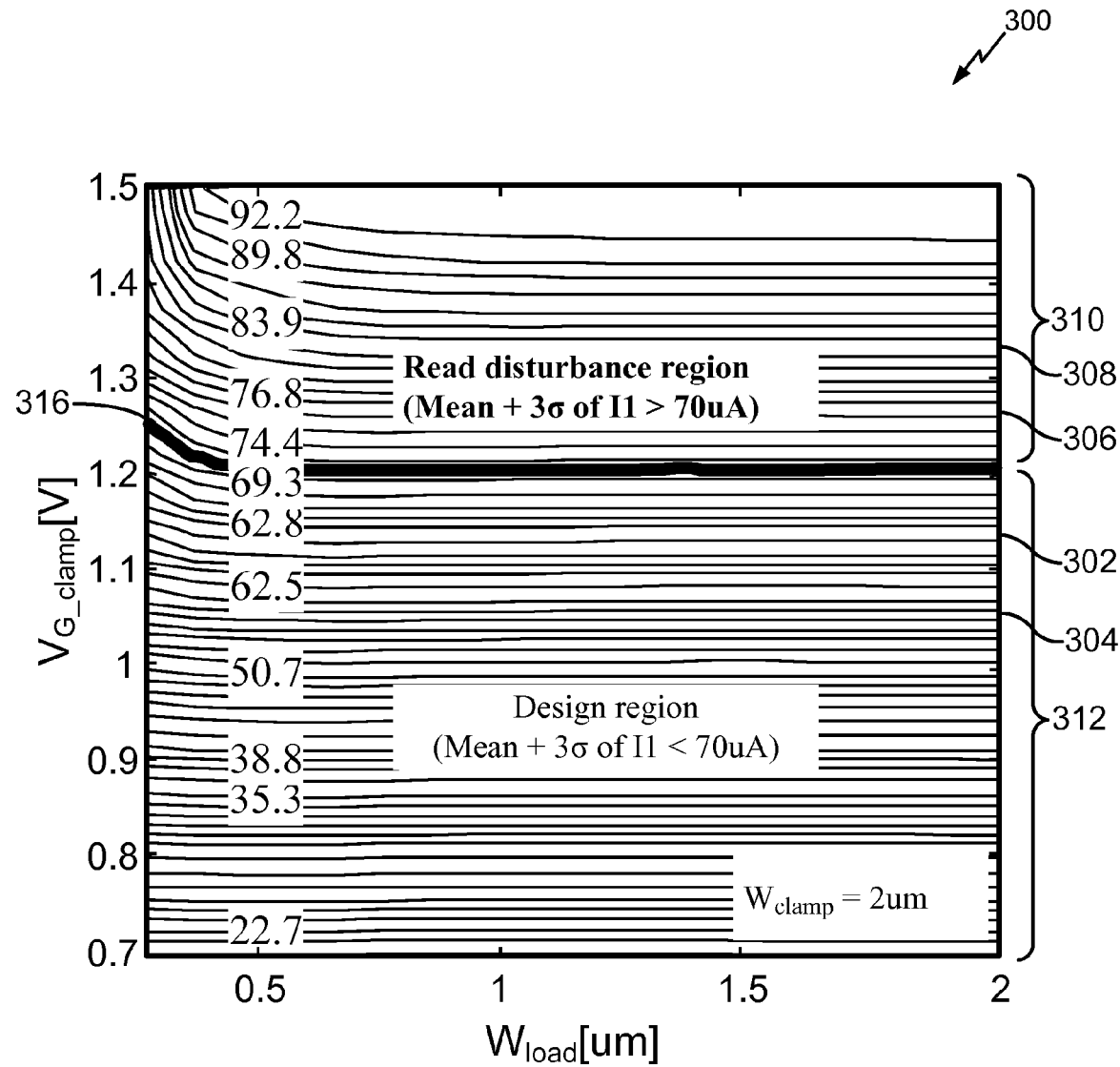
FIG. 3 is a first contour graph representing current data plotted over a range of statistical values generated by the system of FIG. 2 to determine the circuit parameters of the memory circuit of FIG. 1.

FIG. 3 shows a contour graph 300 representing current data plotted over a range of statistical values. The current data may be generated by the system of FIG. 2 to determine circuit parameters of the memory circuit of FIG. 1. The range of statistical values of FIG. 3 may be generated using a range of gate voltages of a clamp transistor (such as the clamp transistor 144) along the y-axis of the graph 300. Physical dimensions, e.g., width, of a load transistor (such as the load transistor 142) may comprise the x-axis of the graph 300. The clamp transistor gate voltages and the widths of the load transistor may be used in a Monte Carlo simulation, along with data pertaining to one of a set of differently sized clamp transistors considered for potential inclusion in a circuit layout 216. For example, the graph 300 of FIG. 3 is associated with a particular clamp transistor size of the set of clamp transistors having a width of two micrometers. Thus, the contour graph 300 of FIG. 3 may represent one of a number of simulations that may be executed to produce current contour graphs simulated over a range of statistical values associated with the particular physical dimensions of a clamp transistor.

The contour graph 300 of FIG. 3 includes representative electrical contour values 302, 304, 306, 308 simulated using a gate voltage and a range of clamp transistor loads. The contour graph 300 identifies a read disturbance area 310. The read disturbance area 310 may include a region of current contour values that, if implemented, would result in a read disturbance, i.e., undesirable memory bit switching within a memory cell. The read disturbance may be known to occur when a current is greater than a read disturbance value. For example, read disturbance may be known to occur when a current exceeds 70 microamperes, in FIG. 3. The current contours 306, 308 may be simulated using a current mean value plus three times a standard deviation to account for current variation. The read disturbance area 310 of FIG. 3 includes simulated current contours 306, 308 having a value of greater than 70 microamperes.

The remaining portion of the contour graph 300 includes and identifies a design range 312. The design range 312 may define acceptable boundary parameters of the gate voltages of the clamp transistor widths of the transistor 142. Current contour values 302, 304 plotted within the design range 312 should not result in a read disturbance. The design range 312 of FIG. 3 may include simulated current contours having a simulated current value of less than 70 microamperes. The design range 312 may include current contours 302, 304 that are simulated using a mean of the current plus a standard deviation to account for current variation. For example, three times a standard deviation ranging from about $1\sigma$ to $5\sigma$ may be used to generate the current contours 302, 304.

The design range 312 and the read disturbance area 314 of FIG. 3 may be mutually bounded and divided by a design boundary line 316. As described below, the design boundary line 316 and associated design range 312 may be included in a second contour graph to determine parameters that include a gate voltage value and size of a clamp transistor, as well as the load of the clamp transistor (e.g., a size of the load transistor 142). The determined parameters may be used to select a sense margin in a manner that accounts for manufacturing process variations.

Figure 4:
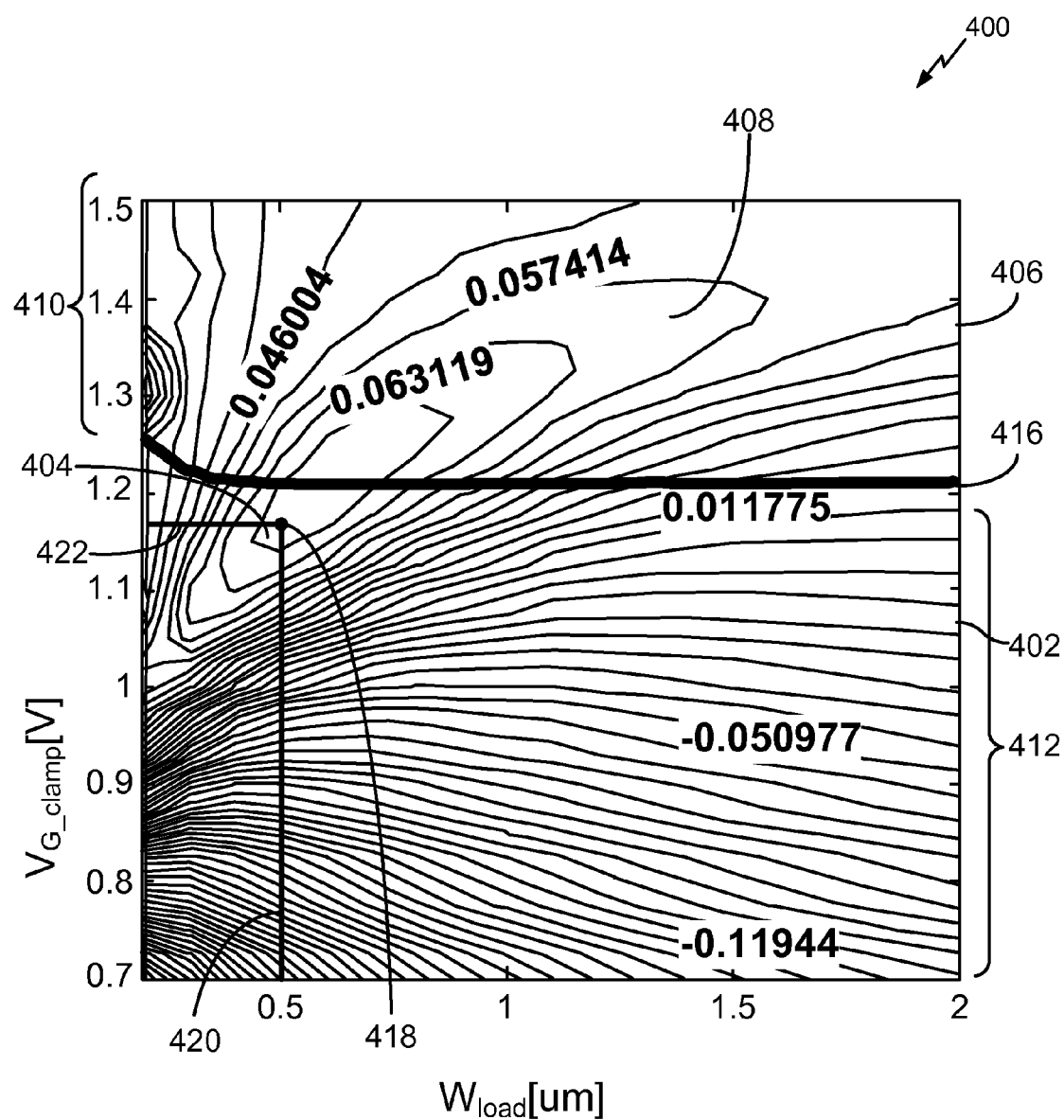
FIG. 4 is a second contour graph generated by the system of FIG. 2 to represent a sense margin over a range of statistical values of a gate voltage and a load of a clamp transistor of FIG. 1.

FIG. 4 shows a second contour graph 400 representing sense margin over a range of statistical values of a gate voltage of a clamp transistor and a width of a load transistor. The graph 400 includes a number of sense margin contour values 402, 404, 406, 408, as may be generated by the system 200 of FIG. 1.

The second contour graph 400 includes a design boundary line 416 corresponding to the design boundary line 316 of FIG. 3. The design boundary line 416 may divide the second contour graph 400 into a read disturbance region 410 and a design region 412. Sense margin contour values 406, 408 plotted in the read disturbance region may be associated with load and gate voltage parameters that, if implemented, would result in a read disturbance.

A sense margin 418 may be automatically plotted. The sense margin 418 may include the highest sense margin within (and satisfying) the design region 412. A line 420 parallel to the y-axis of the graph 400 and extending down from the sense margin 418 to the x-axis may indicate a load value associated with a particularly sized clamp transistor (such as the clamp transistor 144). For example, the width of a load transistor (such as the load transistor 142) may equal about 0.5 micrometers. A y-axis coordinate of the sense margin 418, indicated by line 422, may correspond to a gate voltage of the clamp transistor. In the example of FIG. 4, the desired gate voltage for a two micrometer wide clamp transistor equals about 1.18 volts.

Figure 5:
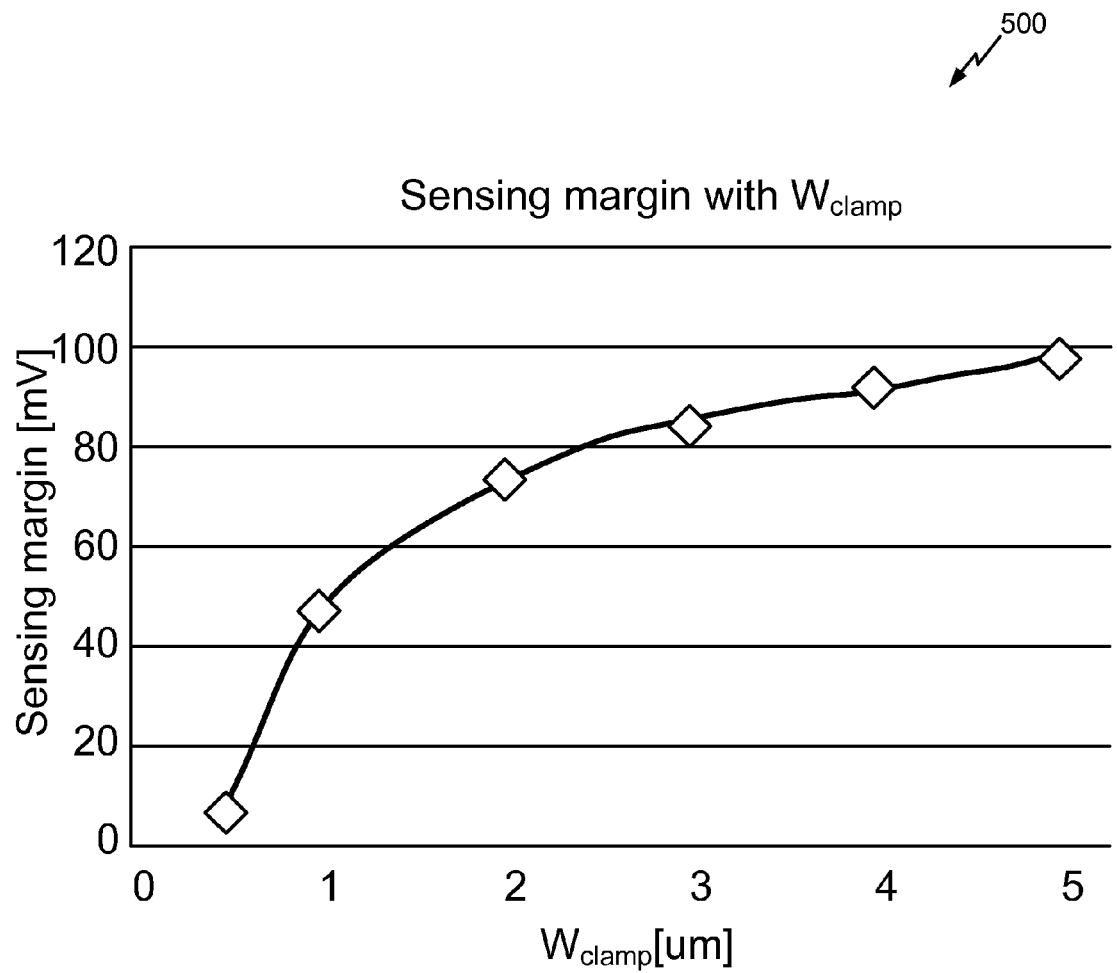
FIG. 5 is a graph that includes a plot of clamp transistor sizes and sense margins determined from the second contour graph of FIG. 4 that may be used to determine the circuit parameters of the memory circuit of FIG. 1.

FIG. 5 shows a graph 500, such as may be generated by the system 200 of FIG. 2, which plots a set of selected clamp transistor width sizes against the sense margins determined from contour graphs, such as the second contour graph 400 of FIG. 4. The graph 500 may be used to automatically or manually determine a size of a clamp transistor to be included in a memory circuit design. The graph 500 may also be used to determine a gate voltage of a clamp transistor as well as a size of a load transistor.

As shown in the graph 500, sizes of the clamp transistor (listed along the x-axis of the graph 500) are proportional to the sense margins (along the y-axis). However, the rate at which the sense margin increases drops off as the size of the clamp transistor continues to increase. Moreover, increasing the size of a clamp transistor can also degrade performance due to parasitic capacitance. Relatively large transistors can also add space related challenges. Thus, the most effective size choice of the clamp transistor is generally not simply the size associated with the largest sense margin.

For example, a two micrometer wide clamp transistor of FIG. 5 may be selected as representing a choice for inclusion within the memory circuit design 100. The sense margin achieved by the two micrometer wide clamp transistor may significantly exceed the sense margin associated with the one micrometer wide clamp transistor. The sense margin of the three micrometer wide clamp transistor, however, may not be substantially larger than the sense margin of the two micrometer wide clamp transistor. Further, the two micrometer wide clamp transistor has lower parasitic capacitance and space requirements than the three micrometer wide clamp transistor. The two micrometer wide clamp transistor, or another transistor, may consequently be selected using the graph 500.

Figure 6:
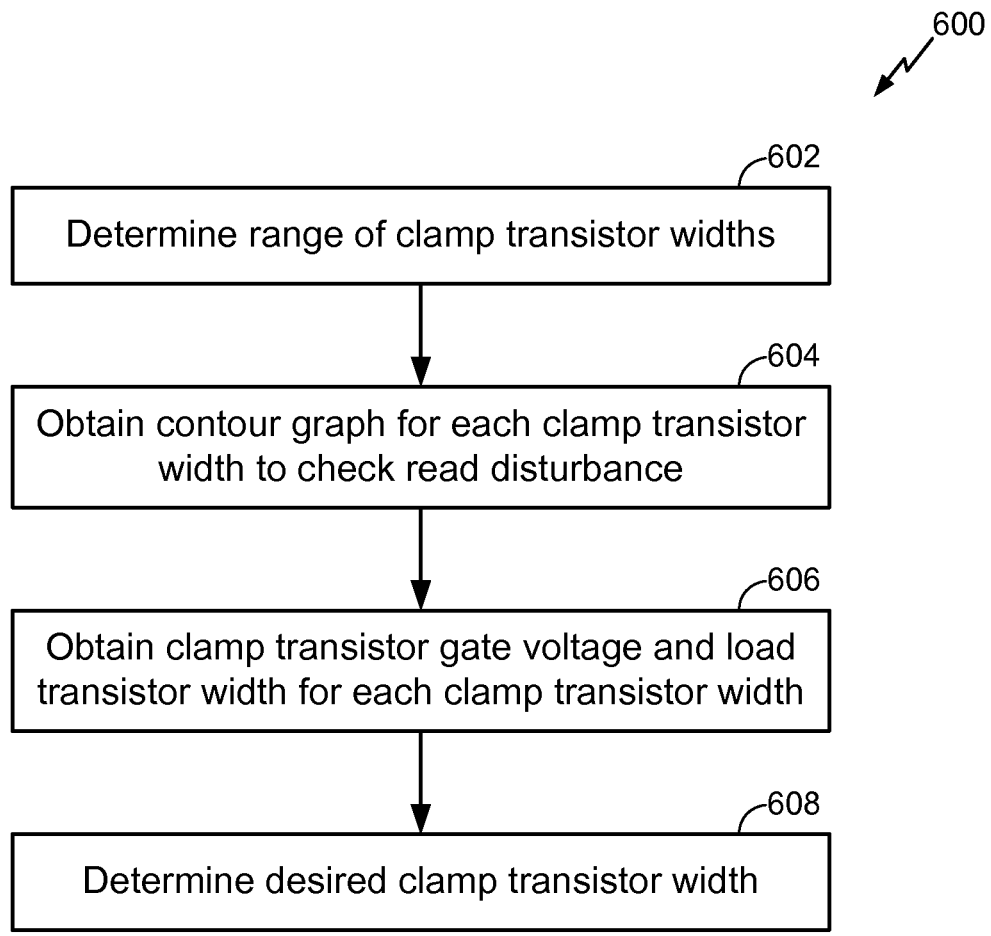
FIG. 6 is a flow chart illustrating a particular embodiment of a method to determine the set of circuit parameters of the memory circuit of FIG. 1.

FIG. 6 is a flow chart illustrating a particular embodiment of a method 600 to determine a set of parameters of a memory circuit, such as the memory circuit of FIG. 1. For example, the method 600 may facilitate the selection of a clamp transistor size that corresponds to a circuit with high sense margin in the presence of process variation. The selection of the clamp transistor size may be based on a sense margin associated with a specific gate voltage and a load value of a clamp transistor.

The method includes determining a range of clamp transistor sizes that may be considered for inclusion within a circuit design, at 602. The range of clamp transistor sizes may be based at least, in part, on transistor size since larger transistor sizes are generally associated with larger sense margins. Other factors influencing generation of the range of sizes may include space considerations and parasitic capacitance. Larger transistors generally have increased parasitic capacitance. Larger transistors may also present challenges associated with making a larger transistor fit within limited space of a design. Selection of the set of sizes may be accomplished using a computer that receives empirical data or other data input.

At 604, a first contour graph of current data, such as the contour graph 300 of FIG. 3, may be generated for each clamp transistor size designated to be in the set of transistors for evaluation. The first contour graph for each size of clamp transistor in the designated set may include a read disturbance area and a design region. A number of current contour values may be generated using Monte Carlo simulations that plot a range of load values versus gate voltages. In one embodiment, the range of load values may include a range of sizes, e.g., widths, of a load transistor designed to be in electrical communication with the clamp transistor. For example, the load transistor 142 may be designed to be in electrical communication with the clamp transistor 144, and the method may identify various widths for the load transistor 142.

Gate and load values for each of the differently sized clamp transistors may be obtained using a second contour graph, at 606. An example of the second contour graph is the second contour graph 400 that includes the design region 412 and the disturbance area 410 determined for each clamp transistor size. The second contour graph may also include a number of sense margin contour values. The method 600 may select a sense margin by determining a highest sense margin included within the design region. From the determined sense margin, a load value associated with a particularly sized clamp transistor may be determined. For example, a width of a load transistor may be identified. Similarly, a gate voltage for the particularly sized clamp transistor may be determined using the selected sense margin, at 606. For example, the gate voltage of the clamp transistor 144 of FIG. 1 may be determined using the selected sense margin 418 shown in FIG. 4.

At 608, a size of the clamp transistor may be determined using the results from 606. A comparison graph may be generated that plots the range of sizes of the selected clamp transistors against the sense margins determined from their respective contour graphs. An example of a comparison graph 500 is shown in FIG. 5. The comparison graph may be used to determine which sized clamp transistor should be included within a circuit layout. For example, the comparison graph 500 of FIG. 5 may be used to select a transistor size for inclusion within the circuit layout 216 of FIG. 2.

FIG. 6 illustrates a method of automatically generating operating parameters for a memory circuit that are configured to achieve high sense margins. The processes used to determine the parameters may account for process variation and read disturbance criteria.

Figure 7:
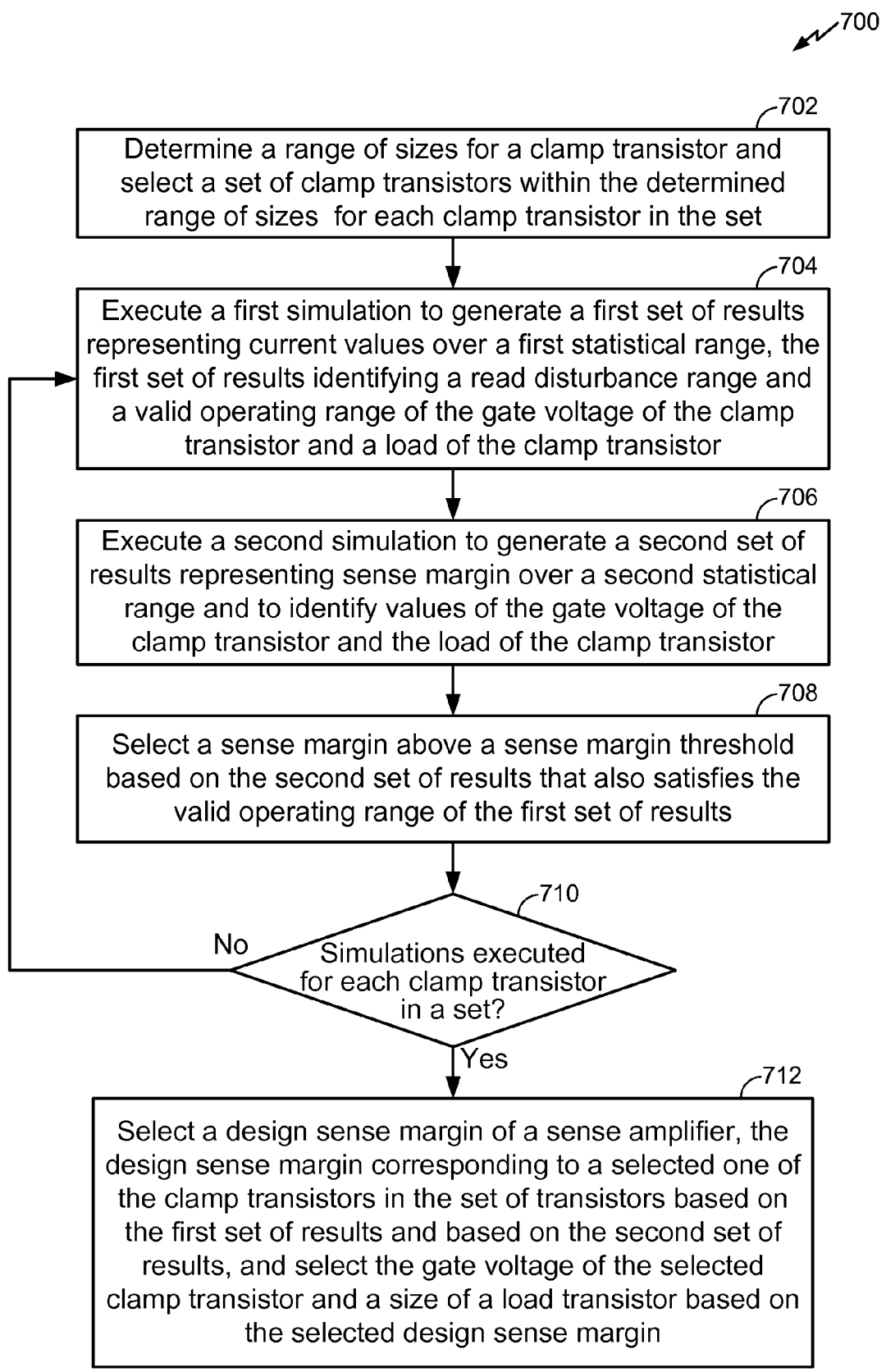
FIG. 7 is a flow chart illustrating another particular embodiment of a method to determine the set of circuit parameters of the memory circuit of FIG. 1.

FIG. 7 is a flow chart illustrating another particular embodiment of a method to determine a set of parameters of a memory circuit. At 702, a range of sizes for a clamp transistor may be determined, and a set of clamp transistors each having a size within the determined range of sizes may be selected. For example, a range of sizes for the clamp transistor 144 may be determined. Consideration for selecting the clamp transistors may include parasitic capacitance, space and inherent sense margin considerations associated with differently sized clamp transistors.

For each clamp transistor size in the set of clamp transistors, the method 700 may include the execution of a first simulation to generate a first set of results representing current values over a first statistical range, at 704. The first set of results may identify a read disturbance range and a valid operating range of the gate voltage of the clamp transistor and a range of sizes of the load transistor. Referring to FIG. 1, the first set of results may identify a read disturbance range and a valid operating range of the gate voltage of the clamp transistor 144 and a range of sizes of the load transistor 144. In the embodiment illustrated in FIG. 3, a first contour graph 300 of current data may be generated for each clamp transistor width designated for evaluation. A number of current contour values may be generated using Monte Carlo simulations that plot a range of load values for a particular clamp transistor along the x-axis of the graph and a range of gate voltages of the clamp transistor along the y-axis. The range of load values may include a range of sizes. For example, in FIG. 1, the range of sizes may include various widths of a load transistor 142 designed to be in electrical communication with the clamp transistor 144.

At 706, the method 700 may perform a second simulation to generate a second set of results representing sense margin over a second statistical range and to identify values of the gate voltage of the clamp transistor and the load of the clamp transistor. A sense margin above a sense margin threshold may be selected based on the second set of results where the selected sense margin also satisfies and is within the valid operating range of the first set of results.

For example, gate voltage and load values for each of the differently sized clamp transistors may be identified using a second contour graph, at 706. As shown in the exemplary second contour graph 400 of FIG. 4, each second contour graph 400 may include a design region 412 and a disturbance area 410 determined for each clamp transistor size. The second contour graph 400 may also include a number of sense margin contour values.

At 708, the method 700 may select a design sense margin of a sense amplifier. The design sense margin corresponds to a selected one of the clamp transistors in the set of transistors based on the first set of results and based on the second set of results. At 710, the method 700 may further select a gate voltage of the selected clamp transistor and a size of a load transistor based on the selected design sense margin. For example, in FIG. 5, the comparison graph 500 may be generated that plots the range of selected clamp transistor sizes against the sense margins determined from respective contour graphs. The comparison graph 500 may facilitate the determination of which sized clamp transistor should be included within a circuit design.

FIG. 7 thus illustrates a method of automatically generating operating parameters for a memory circuit where the operating parameters are configured to achieve high sense margins within operating constraints. The method used to determine the parameters may account for process variation.

Figure 8:
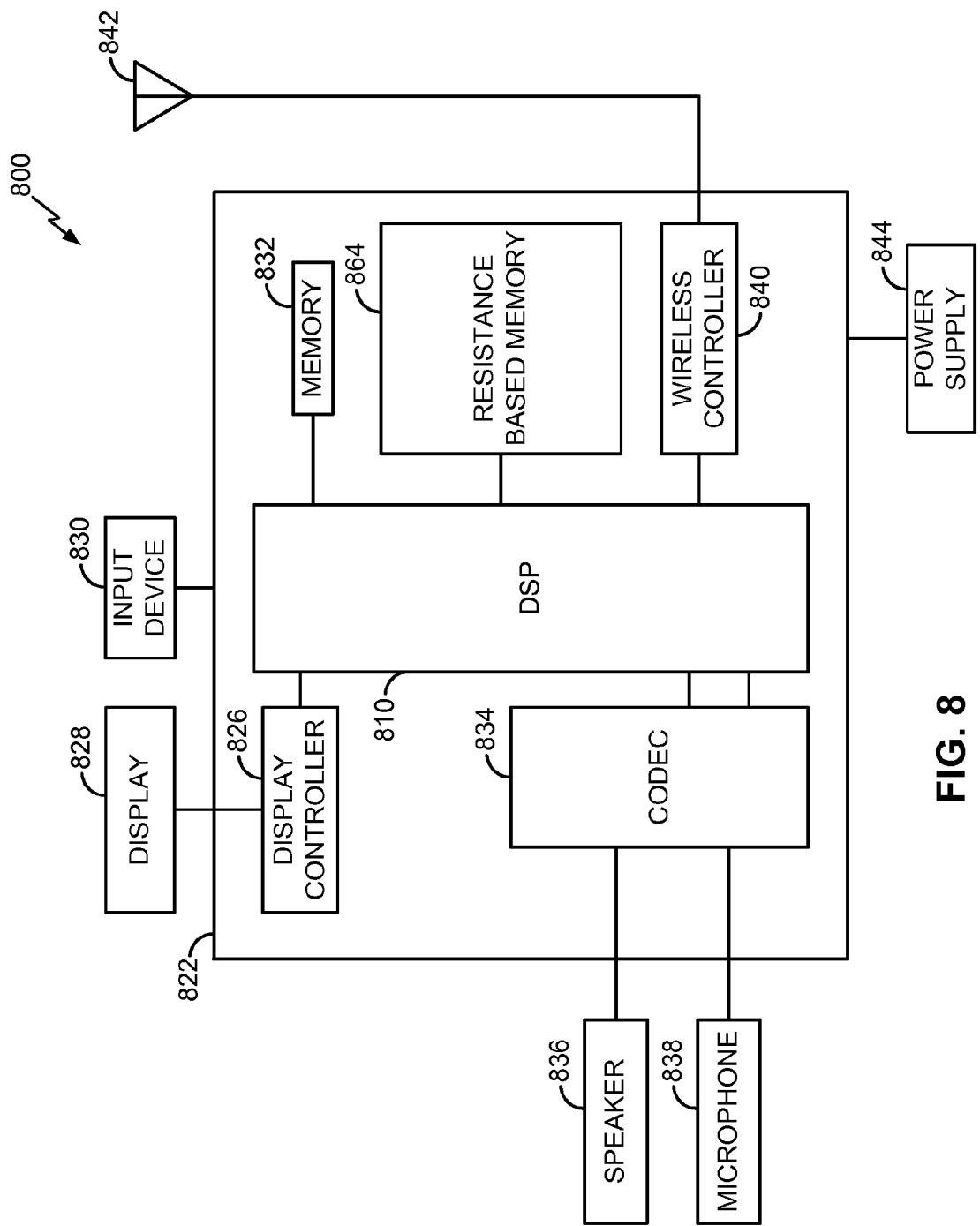
FIG. 8 is a block diagram of an electronic device including a resistive based memory circuit.

Referring to FIG. 8, a block diagram of a particular illustrative embodiment of an electronic device including a resistance-based memory 864, such as the circuits with selected clamp transistor parameters, as described herein, is depicted and generally designated 800. The device 800 includes a processor, such as a digital signal processor (DSP) 810, coupled to a memory 832 and also coupled to the resistance-based memory 864. In an illustrative example, the resistance-based memory 864 may include clamp transistors having a gate voltage, size and load determined using the methods of FIG. 6 or 7, the system or 202, or any combination thereof.

FIG. 8 also shows a display controller 826 that is coupled to the digital signal processor 810 and to a display 828. A coder/decoder (CODEC) 834 can also be coupled to the digital signal processor 810. A speaker 836 and a microphone 838 can be coupled to the CODEC 834.

FIG. 8 also indicates that a wireless controller 840 can be coupled to the digital signal processor 810 and to a wireless antenna 842. In a particular embodiment, the DSP 810, the display controller 826, the memory 832, the CODEC 834, the wireless controller 840, and the resistance-based memory 864 are included in a system-in-package or system-on-chip 822. In a particular embodiment, an input device 830 and a power supply 844 are coupled to the on-chip system 822. Moreover, in a particular embodiment, as illustrated in FIG. 8, the display 828, the input device 830, the speaker 836, the microphone 838, the wireless antenna 842, and the power supply 844 are external to the on-chip system 822. However, each can be coupled to a component of the on-chip system 822, such as an interface or a controller.

Figure 9:
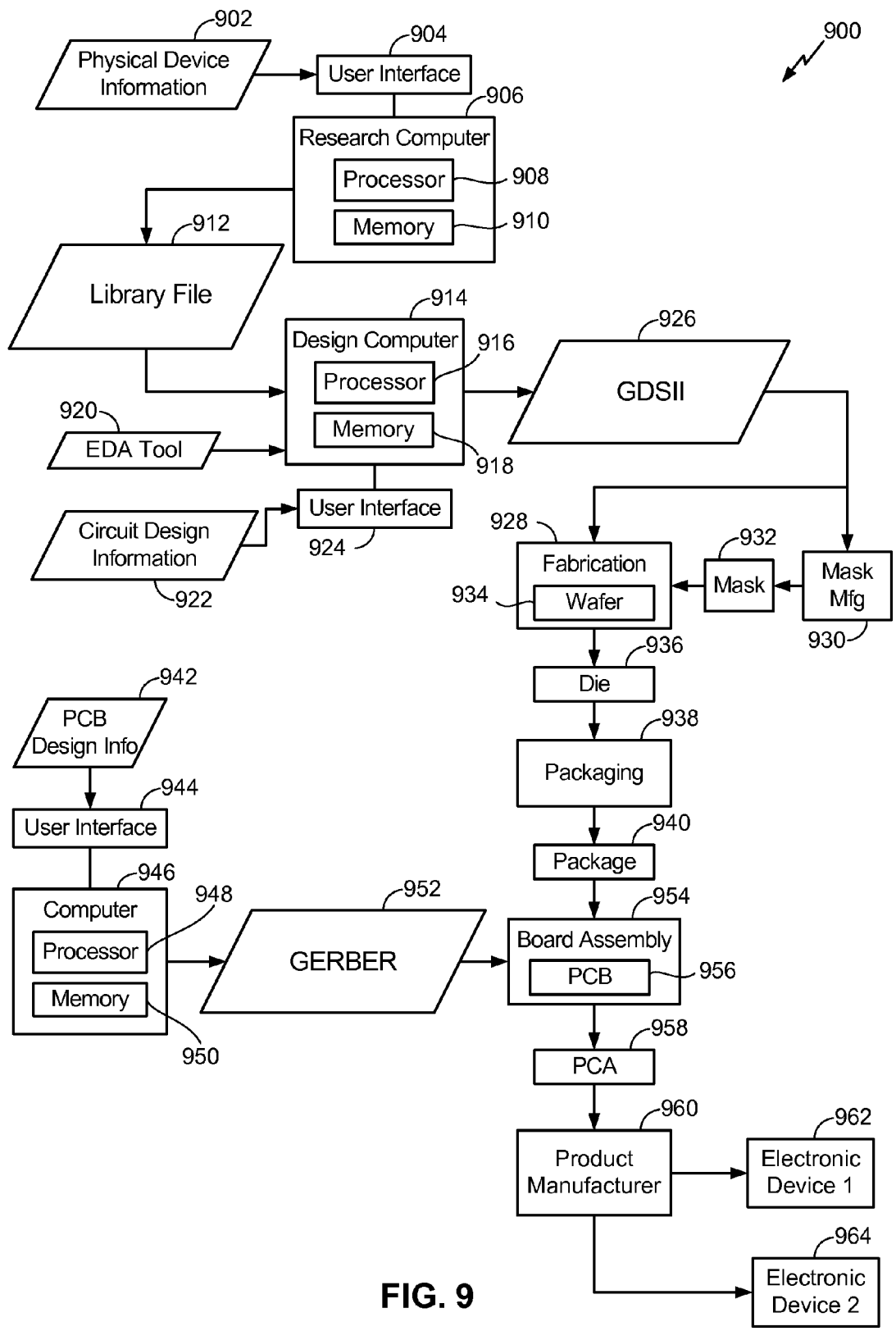
FIG. 9 is a flow chart illustrating a particular illustrative embodiment of an electronic device manufacturing process to manufacture the memory circuit of FIG. 1.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 9 depicts a particular illustrative embodiment of an electronic device manufacturing process 900.

Physical device information 902 is received in the manufacturing process 900, such as at a research computer 906. The physical device information 902 may include design information representing at least one physical property of a semiconductor device, such as the memory circuit 100 of FIG. 1. For example the physical device information 902 may include physical parameters, material characteristics, and structure information that is entered via a user interface 904 coupled to the research computer 906. The research computer 906 includes a processor 908, such as one or more processing cores, coupled to a computer readable medium such as a memory 910. The memory 910 may store computer readable instructions that are executable to cause the processor 908 to transform the physical device information 902 to comply with a file format and to generate a library file 912.

In a particular embodiment, the library file 912 includes at least one data file including the transformed design information. For example, the library file 912 may include a library of semiconductor devices, such as the memory circuit 100 of FIG. 1, which is provided for use with an electronic design automation (EDA) tool 920.

The library file 912 may be used in conjunction with the EDA tool 920 at a design computer 914 including a processor 916, such as one or more processing cores, coupled to a memory 918. The EDA tool 920 may be stored as processor executable instructions at the memory 918 to enable a user of the design computer 914 to design a circuit using, for example, the circuit parameter values 214 of FIG. 2, of the library file 912. For example, a user of the design computer 914 may enter circuit design information 922 via a user interface 924 coupled to the design computer 914. The circuit design information 922 may include design information representing at least one physical property of a semiconductor device, such as the memory circuit 100 of FIG. 1. To illustrate, the circuit design property may include identification of particular circuits and relationships to other elements in a circuit design, positioning information, feature size information, interconnection information, or other information representing a physical property of a semiconductor device.

The design computer 914 may be configured to transform the design information, including the circuit design information 922 to comply with a file format. To illustrate, the file format may include a database binary file format representing planar geometric shapes, text labels, and other information about a circuit layout in a hierarchical format, such as a Graphic Data System (GDSII) file format. The design computer 914 may be configured to generate a data file including the transformed design information, such as a GDSII file 926 that includes information describing memory of FIG. 1, in addition to other circuits or information. To illustrate, the data file may include information corresponding to a system-on-chip (SOC) that includes the memory circuit 100 of FIG. 1 and that also includes additional electronic circuits and components within the SOC.

The GDSII file 926 may be received at a fabrication process 928 to manufacture the memory circuit 100 of FIG. 1 according to transformed information in the GDSII file 926. For example, a device manufacture process may include providing the GDSII file 926 to a mask manufacturer 930 to create one or more masks, such as masks to be used for photolithography processing, illustrated as a representative mask 932. The mask 932 may be used during the fabrication process to generate one or more wafers 934, which may be tested and separated into dies, such as a representative die 936. The die 936 may include a circuit including the memory circuit 100 of FIG. 1.

The die 936 may be provided to a packaging process 938 where the die 936 is incorporated into a representative package 940. For example, the package 940 may include the single die 936 or multiple dies, such as a system-in-package (SiP) arrangement. The package 940 may be configured to conform to one or more standards or specifications, such as Joint Electron Device Engineering Council (JEDEC) standards.

Information regarding the package 940 may be distributed to various product designers, such as via a component library stored at a computer 946. The computer 946 may include a processor 948, such as one or more processing cores, coupled to a memory 950. A printed circuit board (PCB) tool may be stored as processor executable instructions at the memory 950 to process PCB design information 942 received from a user of the computer 946 via a user interface 944. The PCB design information 942 may include physical positioning information of a packaged semiconductor device on a circuit board, the packaged semiconductor device corresponding to the package 940 including the memory circuit 100 of FIG. 1.

The computer 946 may be configured to transform the PCB design information 942 to generate a data file, such as a GERBER file 952 with data that includes physical positioning information of a packaged semiconductor device on a circuit board, as well as layout of electrical connections such as traces and vias, where the packaged semiconductor device corresponds to the package 940 including the memory circuit 100 of FIG. 1. In other embodiments, the data file generated by the transformed PCB design information may have a format other than a GERBER format.

The GERBER file 952 may be received at a board assembly process 954 and used to create PCBs, such as a representative PCB 956, manufactured in accordance with the design information stored within the GERBER file 952. For example, the GERBER file 952 may be uploaded to one or more machines for performing various steps of a PCB production process. The PCB 956 may be populated with electronic components including the package 940 to form a representative printed circuit assembly (PCA) 958.

The PCA 958 may be received at a product manufacture process 960 and integrated into one or more electronic devices, such as a first representative electronic device 962 and a second representative electronic device 964. As an illustrative, non-limiting example, the first representative electronic device 962, the second representative electronic device 964, or both, may be selected from the group of a memory, a set top box, a music player, a video player, an entertainment unit, a navigation device, a communications device, a personal digital assistant (PDA), a fixed location data unit, and a computer. As another illustrative, non-limiting example, one or more of the electronic devices 962 and 964 may be remote units such as mobile phones, hand-held personal communication systems (PCS) units, portable data units, global positioning system (GPS) enabled devices, navigation devices, fixed location data units such as meter reading equipment, or any other device that stores or retrieves data or computer instructions, or any combination thereof.

Thus, the memory circuit 100 of FIG. 1 may be fabricated, processed, and incorporated into an electronic device, as described in the illustrative process 900. One or more aspects of the embodiments disclosed with respect to FIGS. 1-9 may be included at various processing stages, such as within the library file 912, the GDSII file 926, and the GERBER file 952, as well as stored at the memory 910 of the research computer 906, the memory 918 of the design computer 914, the memory 950 of the computer 946, the memory of one or more other computers or processors (not shown) used at the various stages, such as at the board assembly process 954, and also incorporated into one or more other physical embodiments such as the mask 932, the die 936, the package 940, the PCA 958, other products such as prototype circuits or devices (not shown), or any combination thereof. Although various representative stages of production from a physical device design to a final product are depicted, in other embodiments fewer stages may be used or additional stages may be included. Similarly, the process 900 may be executed by a single entity or by one or more entities performing various stages of the process 900.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the stored memory and embodiments disclosed herein may be embodied directly in hardware, in a software module that is executable by a hardware processor, or in a combination of the two. Embodiments may generate parameters for non-volatile memory devices, such as magnetoresistive random access memory (MRAM), that utilize magnetic storage elements. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of determining a set of circuit parameters, the method comprising:
    determining a range of sizes for a clamp transistor and selecting a set of clamp transistors each having a size within the determined range of sizes;
    for each clamp transistor in the set of clamp transistors:
        executing a first simulation to generate a first contour graph representing current data over a range of statistical values, the first contour graph identifying a read disturbance area and a design range of a gate voltage of the clamp transistor and a load of the clamp transistor;
        executing a second simulation to generate a second contour graph representing a sense margin over a range of statistical values of the gate voltage of the clamp transistor and the load of the clamp transistor;
        selecting a first sense margin based on the second contour graph and that satisfies the design range of the first contour graph; and
    determining a second sense margin corresponding to a selected clamp transistor in the set of clamp transistors and selecting a corresponding gate voltage and a corresponding load of the selected clamp transistor based on the second sense margin.

2. The method of claim 1, wherein the selected clamp transistor is within a circuit path that includes a resistance-based memory cell.

3. The method of claim 2, wherein the resistance-based memory cell includes a magnetic tunnel junction (MTJ) device.

4. The method of claim 2, wherein the circuit path includes a load transistor.

5. The method of claim 4, wherein the corresponding load of the selected clamp transistor corresponds to a selected width of the load transistor.

6. The method of claim 1, wherein the first simulation is a Monte Carlo simulation.

7. The method of claim 1, wherein the first sense margin is a largest sense margin within the design range of the first contour graph.

8. The method of claim 1, wherein the selected clamp transistor comprises a component of a memory circuit that includes a magnetoresistive random access memory (MRAM), a phase-change random access memory (PRAM), or a spin torque transfer MRAM (STT-MRAM).

9. The method of claim 1, wherein executing the first simulation to generate the first contour graph, executing the second simulation to generate the second contour graph, selecting the first sense margin, determining the second sense margin, and selecting the corresponding gate voltage are executed at a processor integrated into an electronic device.

10. A method of determining a set of circuit parameters, the method comprising:
    determining a range of sizes for a clamp transistor and selecting a set of clamp transistors each having a size within the determined range of sizes;
    for each clamp transistor in the set of clamp transistors:
        executing a first simulation to generate a first set of results representing current values over a first statistical range, the first set of results identifying a read disturbance range and a valid operating range of a gate voltage of the clamp transistor and a load of the clamp transistor;
        executing a second simulation to generate a second set of results representing a sense margin over a second statistical range and to identify values of the gate voltage of the clamp transistor and the load of the clamp transistor;
        selecting a particular sense margin above a sense margin threshold based on the second set of results and that satisfies the valid operating range of the first set of results;
    selecting a design sense margin of a sense amplifier, the design sense margin corresponding to a selected clamp transistor in the set of transistors based on the first set of results and based on the second set of results; and
    selecting a particular gate voltage of the selected clamp transistor and a size of a load transistor based on the selected design sense margin.

11. The method of claim 10, wherein the load transistor is a p-type metal oxide semiconductor field effect (PMOS) transistor and the selected clamp transistor is an n-type metal oxide semiconductor field effect (NMOS) transistor.

12. The method of claim 10, wherein the sense amplifier is a first sense amplifier that provides an output to a second sense amplifier.

13. The method of claim 10, wherein the selected clamp transistor is responsive to a resistance-based memory cell.

14. The method of claim 13, wherein the resistance-based memory cell is a memory cell of a magnetoresistive random access memory (MRAM).

15. The method of claim 13, wherein the resistance-based memory cell is a memory cell of a phase-change random access memory (PRAM).

16. The method of claim 13, wherein the resistance-based memory cell is a memory cell of a spin transfer torque-magnetoresistive random access memory (STT-MRAM).

17. A sense amplifier circuit comprising:
a p-type metal oxide semiconductor field effect (PMOS) transistor; and
an n-type metal oxide semiconductor field effect (NMOS) transistor;
wherein a size of the PMOS transistor and a gate voltage of the NMOS transistor are determined by:
determining a range of sizes for the NMOS transistor and selecting a set of NMOS transistors having sizes within the determined range of sizes;
for each transistor in the set of NMOS transistors:
executing a first simulation to generate a first set of results representing current values over a first statistical range, the first set of results identifying a read disturbance range and a valid operating range of the gate voltage of the NMOS transistor and a load of the NMOS transistor;
executing a second simulation to generate a second set of results representing a sense margin of a sense amplifier over a second statistical range and to identify values of the gate voltage of the NMOS transistor and the load of the NMOS transistor;
selecting a particular sense margin of the sense amplifier that is above a sense margin threshold based on the second set of results and that is within the valid operating range of the first set of results;
selecting a design sense margin for one transistor in the set of NMOS transistors based on the first set of results and based on the second set of results; and
selecting the gate voltage of the NMOS transistor and the size of the PMOS transistor based on the selected design sense margin.

18. The sense amplifier circuit of claim 17, further comprising a resistance-based memory cell within a circuit path that includes the NMOS transistor and the PMOS transistor.

19. The sense amplifier circuit of claim 18, wherein the resistance-based memory cell includes a cell of a magnetoresistive random access memory (MRAM) device.

20. The sense amplifier circuit of claim 18, wherein the resistance-based memory cell includes a magnetic tunnel junction (MTJ) device.

21. The sense amplifier circuit of claim 17, wherein the sense amplifier is a first sense amplifier that provides an output to a second sense amplifier, and wherein the first sense amplifier is responsive to a resistance presented by a memory cell of a resistance-based memory.

22. The sense amplifier circuit of claim 17, wherein the first simulation is a Monte Carlo type simulation.

23. A processor readable medium having processor instructions that are executable to cause a processor to:
determine a range of sizes for a clamp transistor and selecting a set of clamp transistors having sizes within the determined range of sizes;
for each clamp transistor in the set of clamp transistors:
execute a first simulation to generate a first set of results representing current values over a first statistical range, the first set of results identifying a read disturbance range and a valid operating range of a gate voltage of the clamp transistor and a load of the clamp transistor;
execute a second simulation to generate a second set of results representing a sense margin over a second statistical range and to identify values of the gate voltage of the clamp transistor and the load of the clamp transistor;
select a particular sense margin above a sense margin threshold based on the second set of results and that satisfies the valid operating range of the first set of results;
selecting a design sense margin of a sense amplifier, the design sense margin corresponding to a selected clamp transistor in the set of transistors based on the first set of results and based on the second set of results; and
selecting the gate voltage of the selected clamp transistor and a size of a load transistor based on the selected design sense margin.

24. The processor readable medium of claim 23, wherein the processor instructions are further executable to cause the processor to output a data file that represents a circuit design of a resistance-based memory circuit having the design sense margin.

25. The processor readable medium of claim 23, wherein the processor instructions are compatible with a computer-aided design tool.

26. An apparatus comprising:
means for determining a range of sizes for a clamp transistor and selecting a set of clamp transistors having sizes within the determined range of sizes;
for each clamp transistor in the set of clamp transistors:
means for executing a first simulation to generate a first set of results representing current values over a first statistical range, the first set of results identifying a read disturbance range and a valid operating range of a gate voltage of the clamp transistor and a load of the clamp transistor;
means for executing a second simulation to generate a second set of results representing a sense margin over a second statistical range and to identify values of the gate voltage of the clamp transistor and the load of the clamp transistor;
means for selecting a particular sense margin above a sense margin threshold based on the second set of results and that satisfies the valid operating range of the first set of results;
means for selecting a design sense margin of a sense amplifier, the design sense margin corresponding to a selected clamp transistor in the set of transistors based on the first set of results and based on the second set of results; and
means for selecting a corresponding gate voltage of the selected clamp transistor and a size of a load transistor based on the selected design sense margin.

27. The apparatus of claim 26, wherein the selected clamp transistor is integrated in at least one semiconductor die.

28. The apparatus of claim 27, further comprising a device including a set top box, a music player, a video player, an entertainment unit, a navigation device, a communications device, a personal digital assistant (PDA), a fixed location data unit, a computer, or a combination thereof into which the at least one semiconductor die is integrated.

29. A method comprising:
receiving design information representing at least one physical property of a semiconductor device, the semiconductor device including:
a load transistor; and
a clamp transistor;
wherein a size of the load transistor and a gate voltage of the clamp transistor are determined by:
determining a range of sizes for the clamp transistor and selecting a set of clamp transistors having sizes within the range of sizes;

for each transistor in the set of clamp transistors:
  executing a first simulation to generate a first set of results representing current values over a first statistical range, the first set of results identifying a read disturbance range and a valid operating range of the gate voltage of the clamp transistor and a load of the clamp transistor;
  executing a second simulation to generate a second set of results representing a sense margin of a sense amplifier over a second statistical range and to identify values of the gate voltage of the clamp transistor and the load of the clamp transistor;
  selecting a particular sense margin of the sense amplifier that is above a sense margin threshold based on the second set of results and that is within the valid operating range of the first set of results;
  selecting a design sense margin for one clamp transistor of the set of clamp transistors based on the first set of results and based on the second set of results; and
  selecting the gate voltage of the clamp transistor and the size of the load transistor based on the selected design sense margin;
transforming the design information to comply with a file format; and
generating a data file including the transformed design information.

30. The method of claim 29, wherein the data file includes a GDSII format.

31. A method comprising:
receiving a data file including design information including physical positioning information of a packaged semiconductor device on a circuit board; and
manufacturing the circuit board configured to receive the packaged semiconductor device according to the design information, wherein the packaged semiconductor device comprises:
  a load transistor; and
  a clamp transistor;
  wherein a size of the load transistor and a gate voltage of the clamp transistor are determined by:
    determining a range of sizes for the clamp transistor and selecting a set of clamp transistors having sizes within the range of sizes;
    for each transistor in the set of clamp transistors:
      executing a first simulation to generate a first set of results representing current values over a first statistical range, the first set of results identifying a read disturbance range and a valid operating range of the gate voltage of the clamp transistor and a load of the clamp transistor;
      executing a second simulation to generate a second set of results representing a sense margin of a sense amplifier over a second statistical range and to identify values of the gate voltage of the clamp transistor and the load of the clamp transistor;
      selecting a particular sense margin of the sense amplifier that is above a sense margin threshold based on the second set of results and that is within the valid operating range of the first set of results;
    selecting a design sense margin for one clamp transistor of the set of clamp transistors based on the first set of results and based on the second set of results; and
    selecting the gate voltage of the clamp transistor and the size of the load transistor based on the selected design sense margin.

32. The method of claim 31, wherein the data file has a GERBER format.

33. The method of claim 31, further comprising integrating the circuit board into a device that includes a set top box, a music player, a video player, an entertainment unit, a navigation device, a communications device, a personal digital assistant (PDA), a fixed location data unit, a computer, or a combination thereof.

* * * * *

UNITED STATES PATENT AND TRADEMARK OFFICE
CERTIFICATE OF CORRECTION

PATENT NO. : 8,423,329 B2  
APPLICATION NO. : 12/691415  
DATED : April 16, 2013  
INVENTOR(S) : Jung et al.

It is certified that error appears in the above-identified patent and that said Letters Patent is hereby corrected as shown below:

On the Title Page

Item [73] Assignees should read: QUALCOMM Incorporated, San Diego, CA (US)
Industry-Academic Cooperation Foundation, Yonsei University, Seoul, Korea (KR)

Signed and Sealed this
Fifteenth Day of April, 2014

Michelle K. Lee
*Deputy Director of the United States Patent and Trademark Office*